(12) United States Patent
Eichstaedt et al.

(10) Patent No.: US 7,069,304 B1
(45) Date of Patent: Jun. 27, 2006

(54) CUSTOMIZABLE WEB FILLER FOR ALLEVIATION OF NETWORK LATENCY AND DELAY

(75) Inventors: Matthias Eichstaedt, San Jose, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 09/092,791

(22) Filed: Jun. 5, 1998

(51) Int. Cl.
*G06F 15/16* (2006.01)
(52) U.S. Cl. ................................... 709/207
(58) Field of Classification Search .............. 709/2.35, 709/250, 224, 203, 207; 395/793; 345/733; 370/235
See application file for complete search history.

(56) References Cited

U.S. PATENT DOCUMENTS

| | | | |
|---|---|---|---|
| 5,434,906 A | | 7/1995 | Robinson et al. |
| 5,572,643 A | | 11/1996 | Judson |
| 5,581,604 A | | 12/1996 | Robinson et al. |
| 5,636,269 A | | 6/1997 | Eisdorfer |
| 5,802,292 A | * | 9/1998 | Mogul ........................ 709/203 |
| 5,809,242 A | * | 9/1998 | Shaw et al. .................. 709/217 |
| 5,822,543 A | * | 10/1998 | Dunn et al. .................. 709/224 |
| 5,864,611 A | * | 1/1999 | Ching et al. ................. 379/134 |
| 5,913,040 A | * | 6/1999 | Rakavy et al. ............... 709/232 |
| 5,996,007 A | * | 11/1999 | Klug et al. ................... 709/218 |
| 6,011,537 A | * | 1/2000 | Slotznick ..................... 345/733 |
| 6,091,709 A | * | 7/2000 | Harrison et al. ............. 370/235 |
| 6,411,998 B1 | * | 6/2002 | Bryant et al. ................ 709/224 |

OTHER PUBLICATIONS

V.N. Padmanabhan et al., "Using Predictive Prefetching to Improve World Wide Web Latency" *Comput. Commun. Rev.*, vol. 26, No. 3, ACM, Jul. 1996, pp. 22-26.
IBM Corporation, Internet article, http://www.spi.org/cgi-bin/newqry?ISA-....1997&rec=1&submit=seeit &csum110536666078, Software Patent Institute Database of Software Technologies, Record Display, Record 1, Oct. 25, 1997.

* cited by examiner

*Primary Examiner*—Paul H. Kang
(74) *Attorney, Agent, or Firm*—Gates & Cooper LLP (57) ABSTRACT

A method, apparatus, and article of manufacture for alleviating problems of long latency or delay periods on the Internet through the presentation of filler content that keeps the user occupied. The cause and extent of the latency or delay may be identified either at a client or server computer and then communicated to the client computer to trigger the presentation of the filler content on the client computer. The filler content may comprise text data, graphics data, audio data, audiovisual data, or other data as desired, and provides just enough distraction to keep the user occupied, while retaining him/her for the completion of the session, transaction, or activity. The filler content may be provided by either a server computer or a client computer, and may be selected automatically by the server computer or the client computer or may be selected manually by the user so that it can be customized based on his/her taste for filler contents. The filler content could also be selected based on predetermined criteria, such as the context of the user's session, transaction, or activity, the data being accessed, etc.

27 Claims, 5 Drawing Sheets

CUSTOMIZABLE WEB FILLER FOR ALLEVIATION OF NETWORK LATENCY AND DELAY

BACKGROUND OF THE INVENTION

1. Field of the Invention

This invention relates in general to web browsers and servers, and more particularly, to a customizable web filler for alleviation of network latency and delay periods.

2. Description of Related Art

Downloading content from the Internet often takes a considerable amount of time and therefore users lose interest in the content itself. The long download time may be due to one or more of the following reasons:

1. Web pages that contain large amounts of data (graphics, Java applets, etc.), all of which has to be sent to the client during download.
2. Slow connections to the server due to heavy network load.
3. Limited power of computing/communication hardware on the server or client.
4. Intensive computation performed on the server (authentication/authorization in e-commerce applications) before a page can be fed back to the client.

Users typically dislike such web sites or content providers that have poor response time and tend to terminate the transaction. This could mean loss of business for vendors or content providers. This problem is more aggravated for users with short attention spans, like children.

It can be seen, then, that there is a need in the art for solutions that helps alleviate the problems of long latency or delay periods on the Internet.

SUMMARY OF THE INVENTION

To minimize the limitations in the prior art described above, and to minimize other limitations that will become apparent upon reading and understanding the present specification, the present invention discloses a method, apparatus, and article of manufacture for alleviating problems of long latency or delay periods on the Internet through the presentation of filler content that keeps the user occupied. The cause and extent of the latency or delay may be identified either at a client or server computer and then communicated to the client computer to trigger the presentation of the filler content on the client computer. The filler content may comprise text data, graphics data, audio data, audiovisual data, or other data as desired, and provides just enough distraction to keep the user occupied, while retaining him/her for the completion of the session, transaction, or activity. The filler content may be provided by either a server computer or a client computer, and may be selected automatically by the server computer or the client computer or may be selected manually by the user so that it can be customized based on his/her taste for filler contents. The filler content could also be selected based on predetermined criteria, such as the context of the user's session, transaction, or activity, the data being accessed, etc.

An object of the present invention is to deliver timely content to the user without distracting from other activities being performed on the network. Another object is that the web filler can help users to utilize their time more efficiently, because it uses idle periods of Internet access. Yet another object of the present invention is to enhance the usability of the Internet.

A feature of the present invention is that it can be realized on many current commercial web server products with relatively low cost, because it can be implemented with well-structured extensions to existing software. Another feature of the present invention is that none of the other existing software systems have to be changed to implement the present invention.

Advantages of the present invention over existing and possible alternatives include the following:

1. The Web Filler is a software solution that can be implemented as one or more additional components in a web browser.
2. The Web Filler does not cause significant latency or delay for downloading the filler content.
3. The Web Filler helps promote web sites, because a web site that implements the Web Filler should not lose users due to long latency or delay periods. This is particularly important for e-commerce applications.
4. The Web Filler is fully customizable, both on the client computer and the server computer. It can easily be disabled as required.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention, known as Web Filler, helps alleviate the problems of long latency or delay periods on the Internet through the use of filler content, wherein the presentation of the filler content keeps the user occupied during the period of latency or delay. The filler content may comprise text data, graphics data, audio data, audiovisual data, or other data as desired.

The filler content is typically comprised of short snippets of data, e.g., information or entertainment, that provide just enough distraction to keep the user occupied, while retaining him/her for the completion of the session, transaction, or activity. A good source for such filler content are so-called "web-casting" channels (e.g., PointCast™), quote-of-the-day sites, etc.

The filler content may be provided by either the server computer or the client computer. Filler content may be selected automatically by the server computer or the client computer, or may be selected manually by the user so that it can be customized based on his/her taste for filler contents.

The filler content could also be selected based on predetermined criteria, such as the context of the user's session, transaction, or activity, the data being accessed, etc. As an example, when the user views and downloads technical specifications for a product, any latency or delay can be filled with other information about the product, e.g., the price and availability of the product. This is somewhat similar to search engines that display advertisements related to the user's search request.

Because the filler content may be directly related to context of the user's transaction or session, any distraction caused by the filler content is minimal. Nonetheless, the ability to customize the filler content is important, as surveys have shown that such information as news tickers, advertisements, etc., are very distracting for many users.

Hardware Environment

Figure 1:
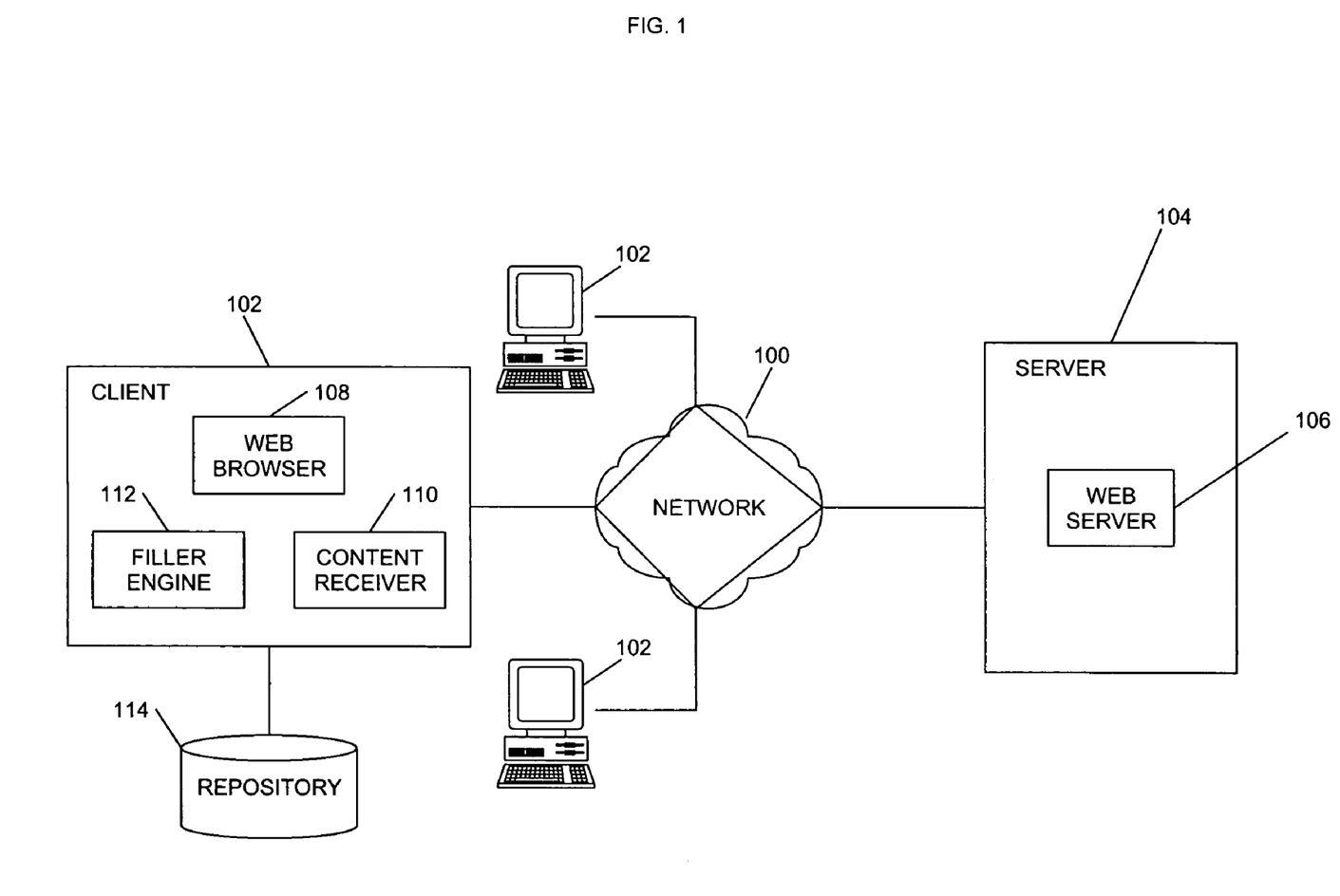
FIG. 1 is a block diagram of an exemplary hardware environment of the preferred embodiment of the present invention, and more particularly, illustrates a typical distributed computer system.

FIG. 1 is a block diagram of an exemplary hardware environment of the preferred embodiment of the present invention, and more particularly, illustrates a typical distributed computer system, wherein a network 100 connects client computers 102 to server computers 104. The network 100 preferably comprises the Internet, although it could also comprise intranets, extranets, LANs, WANs, SNA networks, etc. A typical combination of resources may include client computers 102 that are personal computers or workstations, and server computers 104 that are personal computers, workstations, minicomputers, and/or mainframes.

Each of the computers generally include, inter alia, a processor, random access memory (RAM), data storage devices, data communications devices, monitors, input devices, etc. Of course, those skilled in the art will recognize that any combination of the above components, or any number of different components, peripherals, and other devices, may be used in the present invention.

In the present invention, the server computer 104 executes a web server 106, and the client computer 102 executes a web browser 108. The web server 106 is typically a computer program such as IBM's HTTP daemon or other World Wide Web (WWW) daemon, and the web browser 108 is typically a computer program such as IBM's Web Explorer™, Netscape's Navigator™, Microsoft's Internet Explorer™, etc.

In the present invention, the Web Filler is comprised of a content receiver 110 and filler engine 112 executed by the client computer 102. In addition, the Web Filler is comprised of a filler and template repository 114, which may be stored in a memory or data storage device of the client computer 102.

Generally, the web server 106, web browser 108, content receiver 110, filler engine 112, and/or repository 114 comprise instructions and/or data which, when read, executed, and/or interpreted by the client computer 104 and/or server computer 106, causes the client computer 104 and/or server computer 106 to perform the steps necessary to implement and/or use the present invention. Generally, the web server 106, web browser 108, content receiver 110, filler engine 112, and/or repository 114 are embodied in and/or readable from a device, carrier, or media, such as a memory, data storage device, and/or a remote device coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the Web Filler

As noted above, the Web Filler is generally comprised of three components: the content receiver 110, the filler engine 112, and the repository 114. The Web Filler operates mainly in two modes: client mode or server mode. The same components 110, 112, and 114 may be used in both modes, although their operation may differ somewhat.

In both modes, the content receiver 110 retrieves the filler content from the web server 106 and optionally updates the repository 114. Generally, the content receiver 110 may be implemented as an extension to the web browser 108 or as a stand-alone component. Usually, the content receiver 110 does not download any filler content while the user is browsing; instead, the filler content is preferably received at scheduled points in time and should not interfere with other activities.

In both modes, the filler engine 112 is responsible for initiating use of the filler content when appropriate and then presenting the filler content. As with the content receiver 110, the filler engine 112 may be implemented as an extension to the web browser 108 or as a stand-alone component. The filler engine 112 may be triggered by detection of latency or delay periods by the web server 106, the web browser 108, or its own monitoring function. Once triggered, the filler engine 112 does not interrupt the current session, transaction or activity, or the accessing of data in any way; instead, the filler engine 112 presents the filler content while the session, transaction, or activity continues in the background. Once the session, transaction, or activity is completed, the web server 106 or web browser 108 sends a signal to the filler engine 112 that deactivates the presentation of the filler contents, so that the web browser 108 can again regain control and present the data associated with its session, transaction, or activity.

In the client mode, the filler contents are stored in the repository 114 on the client computer 102 and are retrieved therefrom when the client computer 102 encounters a period of latency or delay. Filler contents may be static or dynamic, wherein dynamic filler contents could comprise templates that are updated with new information at regular intervals (e.g., stock quotes, headline news, etc.).

Presentation of the filler contents by the filler engine 112 is an iterative process. If the presentation of the filler contents completes before a session, transaction, or activity of the web browser 108 completes, new filler contents are retrieved by the filler engine 112 and presented. If the session, transaction, or activity of the web browser 108 completes before the presentation of the filler contents completes, the filler engine 112 terminates the presentation of the filler contents and the web browser 108 regains control.

Server mode differs from client mode in two important ways. First, the presentation of filler contents is triggered when the server computer 104 detects latencies or delays in the session, transaction, or activity. Second, the filler contents are not displayed on the server computer 104 itself, but only on the client computer 102. In the server mode, the same components 110, 112, 114 may be used, except that the repository 114 is optional. In addition, the filler contents may be retrieved by the content receiver 110 from the server computer 104 and then directly passed to the filler engine 112, or the server computer 104 may transmit a message to the client computer 102 that triggers the filler engine 112 to retrieve the filler contents from the repository 114. If the filler contents are downloaded from the server computer 104, it is important that the ratio of transmitted filler contents to transmitted data associated with the session, transaction, or activity is low and does not cause too much additional latency or delay.

The key advantage of operating in the server mode is that the server computer 104 has more knowledge concerning the cause and extent of any latency or delay, and thus may select appropriate filler content and transmit it to the client computer 102 for presentation. Moreover, user profiles for the customized filler contents may either be stored either on the client computer 102 or the server computer 104 to assist in this selection.

Customized Filler Content

Figure 2:
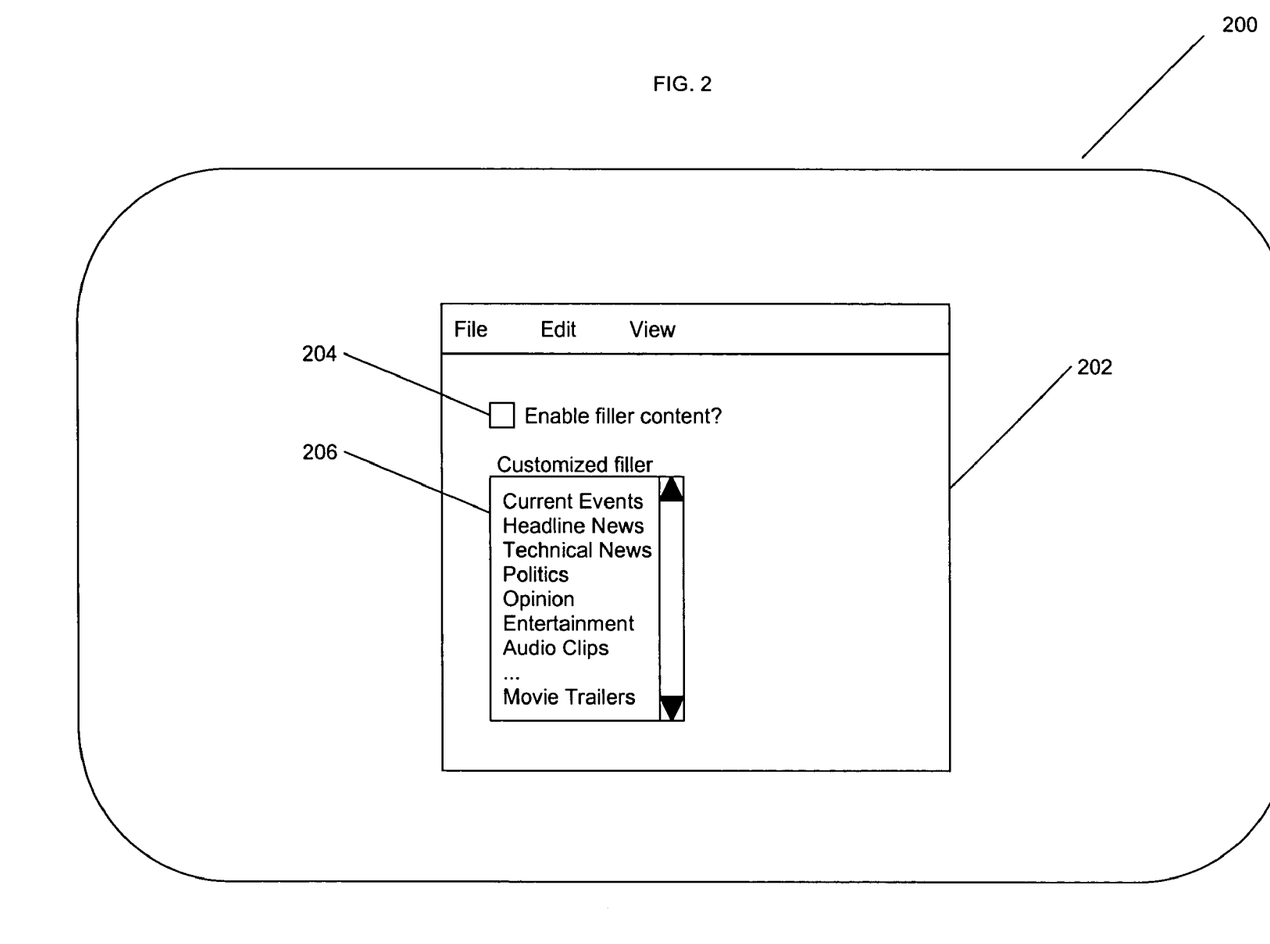
FIG. 2 illustrates a dialog box for customizing filler content according to the present invention.

FIG. 2 illustrates a monitor 200 of a client computer 102 displaying an exemplary dialog box 202 that could be used to customize the filler content according to the present invention. Generally, this dialog box 202 is accessed via the web browser 108 or other utility. The dialog box 202 includes a checkbox 206 for enabling and disabling the use of filler content, as well as a listbox 208 for selecting among various categories of filler content. In the preferred embodiment, the filler content is stored on both the client computer 102 and the server computer 104 according to such categories in order to make retrieval of the desired filler content easier.

Logic of the Web Browser in Client Mode

Figure 3:
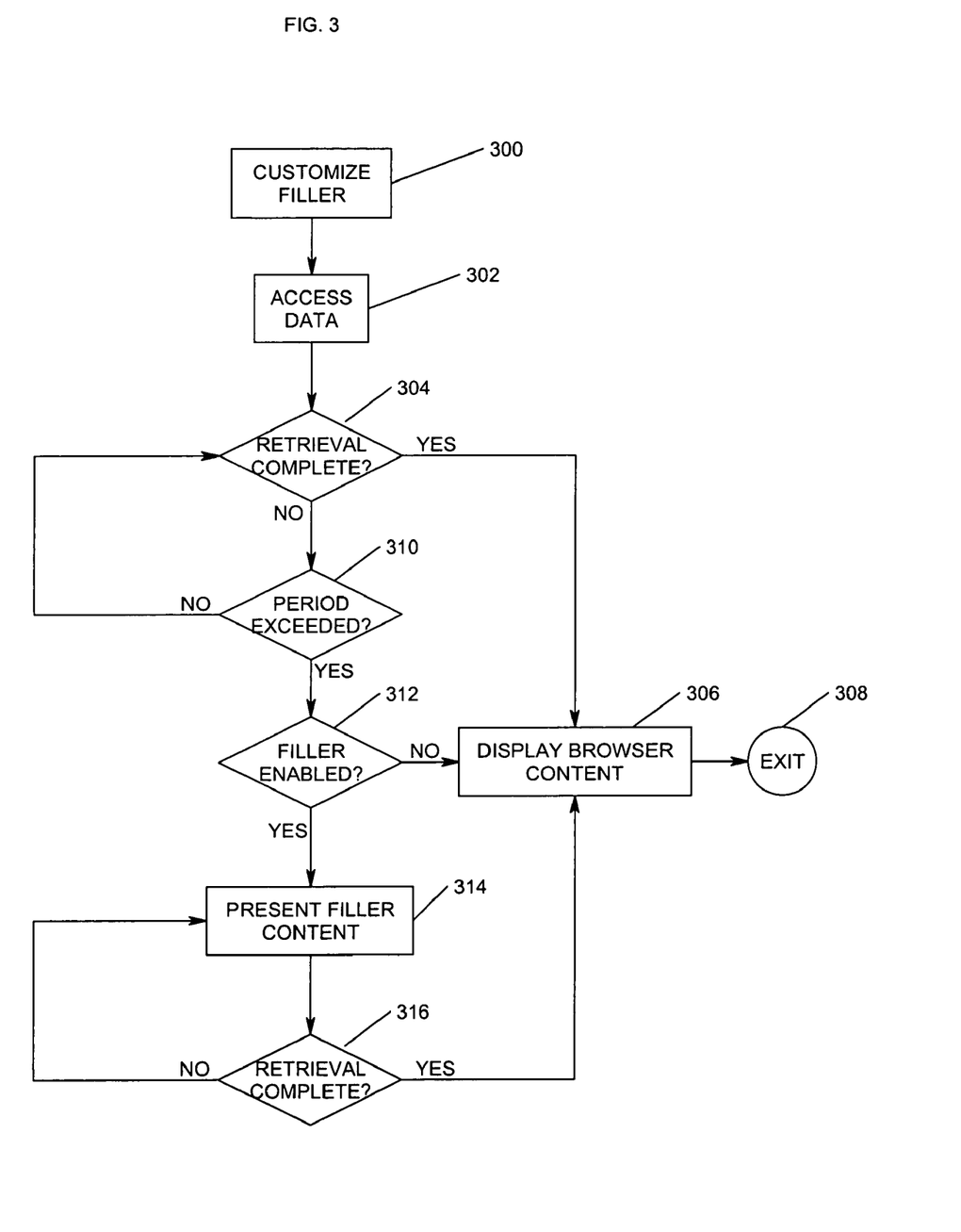
FIG. 3 is a flowchart illustrating the logic performed by a web browser in client mode according to the present invention.

FIG. 3 is a flowchart illustrating the logic performed by Web Filler according to the present invention, and more specifically, the logic performed by the web browser 108 in client mode. This logic is described in conjunction with the operation of the Web Filler as being separate from the web browser 108. Those skilled in the art will recognize that similar logic would be used if the web filler were part of the web browser 108.

Block 300 represents the web browser 108 enabling the use of filler contents and specifying user-customized selections for such filler content.

Block 302 represents the web browser 108 accessing data on the network 100 as part of a session, transaction, or activity.

Block 304 is a decision block that represents the web browser 108 determining whether the accessing of the data from the network 100 has completed. If so, control transfers to Block 306; otherwise, control transfers to Block 310.

Block 306 represents the web browser 108 displaying the accessed data. Thereafter, control transfers to Block 308, which terminates the logic.

Block 310 is a decision block that represents the web browser 108 determining whether a predetermined latency or delay period has been exceeded. If not, control transfers to Block 304; otherwise, control transfers to Block 312.

Block 312 is a decision block that represents the web browser 108 determining whether the Web Filler is enabled. If not, control transfers to Block 306; otherwise, the filler engine 112 is triggered and control transfers to Block 314.

Block 314 represents the filler engine 112 performing the Web Filler function, wherein the filler contents are presented for the user on the client computer 104.

Block 316 is a decision block that represents the web browser 108 and/or filler engine 112 determining whether the accessing of the data from the network 100 has completed. If not, control transfers to Block 314; otherwise, the filler engine 112 is disabled and control transfers to Block 306.

Logic of the Web Server in Server Mode

Figure 4:
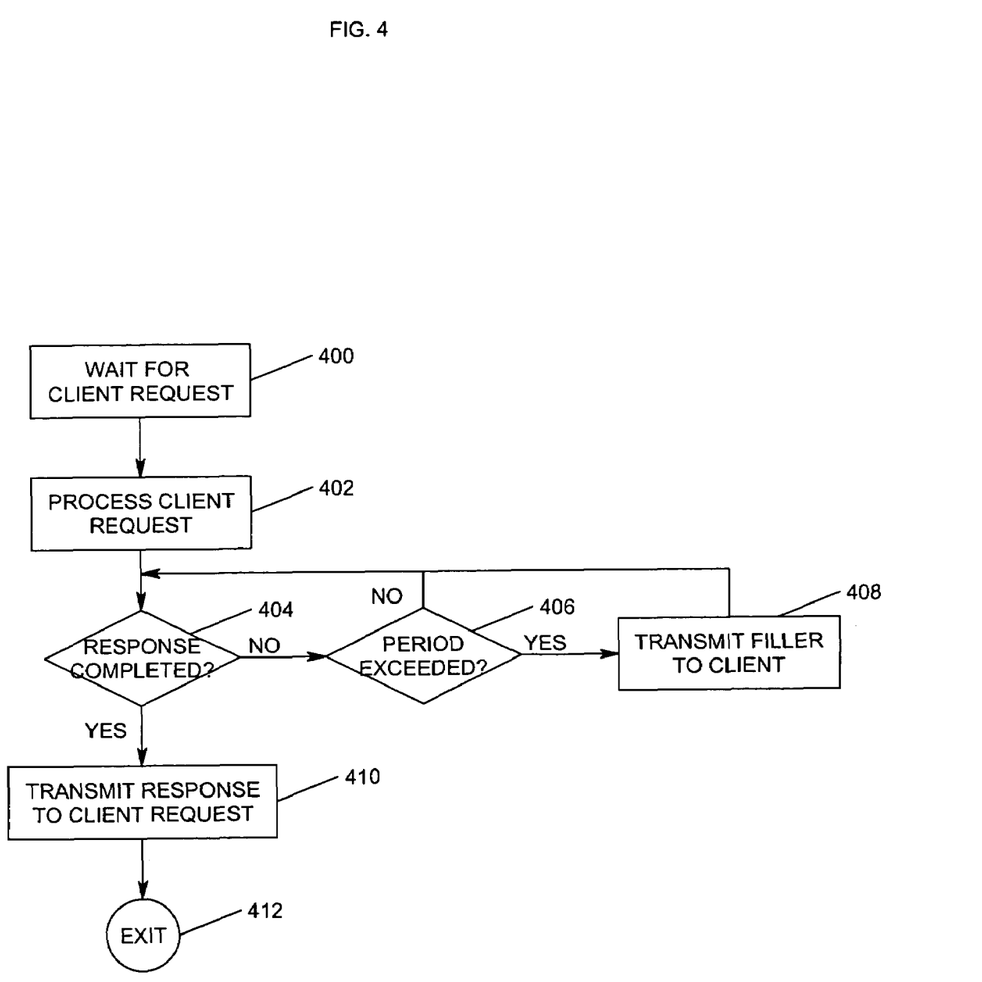
FIG. 4 is a flowchart illustrating the logic performed by a web server in server mode according to the present invention.

FIG. 4 is a flowchart illustrating the logic performed by Web Filler according to the present invention, and more specifically, the logic performed by the web server 106 in server mode.

Block 400 represents the web server 106 waiting for a request from the client computer 102, and more specifically, from the web browser 108 request access to data on the network 100 as part of a session, transaction, or activity.

Block 402 represents the web server 106 processing the request from the client computer 102.

Block 404 is a decision block that represents the web server 106 determining whether the response to the request, e.g., the response to the request to access the data from the network 100, has completed. If not, control transfers to Block 406; otherwise, control transfers to Block 410.

Block 406 is a decision block that represents the web server 106 determining whether a predetermined latency or delay period has been exceeded. If not, control transfers to Block 404; otherwise, control transfers to Block 408.

Block 408 represents the web server 106 performing the Web Filler function in server mode, wherein the filler contents may be transmitted to the content receiver 110 from the server computer 104 and then directly passed to the filler engine 112, or the server computer 104 may transmit a message to the client computer 102 that triggers the filler engine 112 to retrieve the filler contents from the repository 114. Thereafter, control transfers to Block 404.

Block 410 represents the web server 106 transmitting the response to the request to the client computer 102. Thereafter, control transfers to Block 412, which terminates the logic.

Logic of the Web Browser in Server Mode

Figure 5:
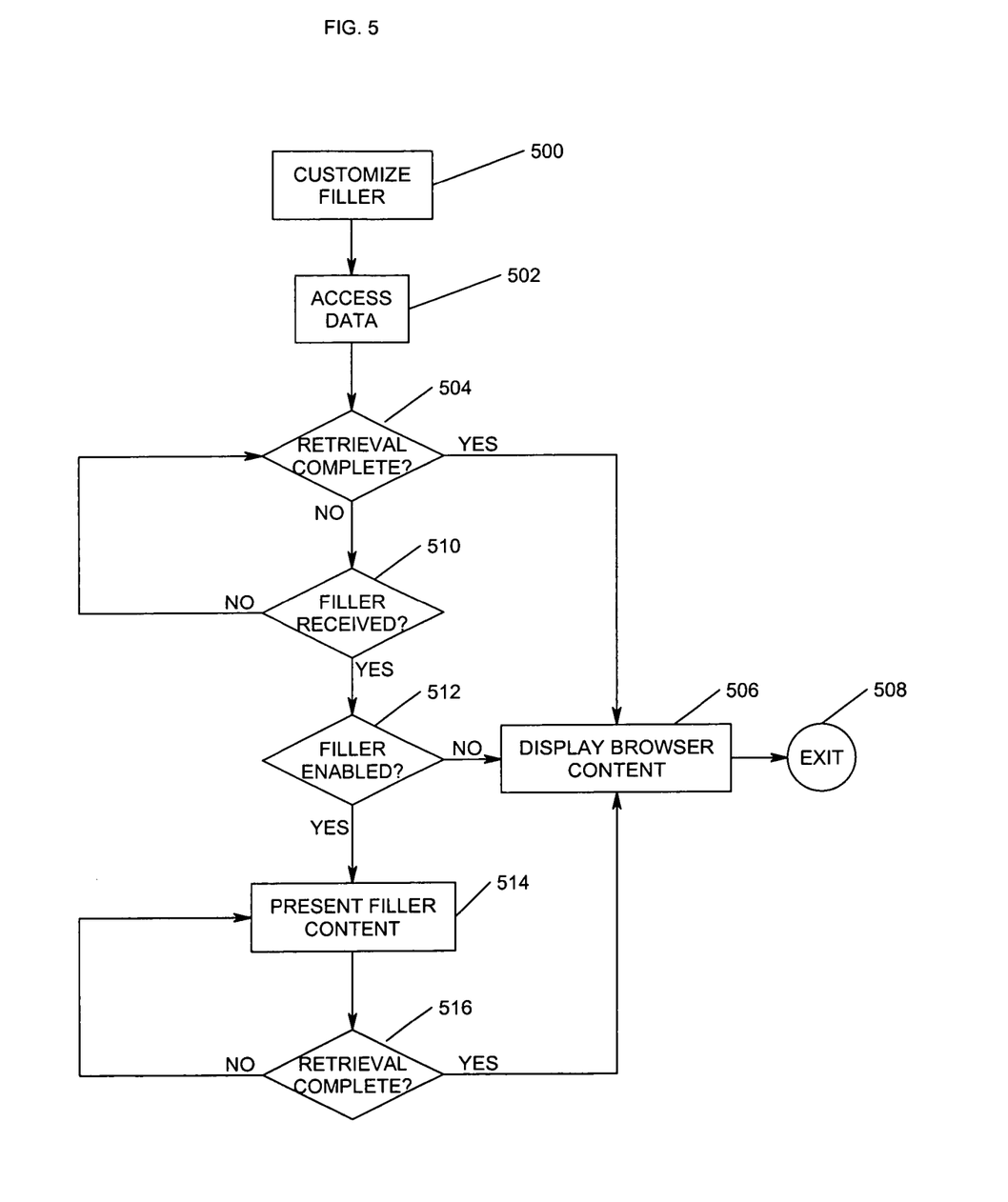
FIG. 5 is a flowchart illustrating the logic performed by a web browser in server mode according to the present invention.

FIG. 5 is a flowchart illustrating the logic performed by Web Filler according to the present invention, and more specifically, the logic performed by the web browser 108 in server mode. This logic is described in conjunction with the operation of the Web Filler as being separate from the web browser 108. Those skilled in the art will recognize that similar logic would be used if the web filler were part of the web browser 108.

Block 500 represents the web browser 108 enabling the use of filler contents and specifying user-customized selections for such filler content.

Block 502 represents the web browser 108 accessing data on the network 100 as part of a session, transaction, or activity.

Block 504 is a decision block that represents the web browser 108 determining whether the accessing of the data from the network 100 has completed. If so, control transfers to Block 506; otherwise, control transfers to Block 510.

Block 506 represents the web browser 108 displaying the accessed data. Thereafter, control transfers to Block 508, which terminates the logic.

Block 510 is a decision block that represents the web browser 108 determining whether filler contents have been received by the content receiver 110 from the server computer 104, or whether a message has been received from the server computer 104 that triggers the filler engine 112 to retrieve the filler contents from the repository 114. If not, control transfers to Block 504; otherwise, control transfers to Block 512.

Block 512 is a decision block that represents the web browser 108 determining whether the Web Filler is enabled. If not, control transfers to Block 506; otherwise, the filler engine 112 is triggered and control transfers to Block 514.

Block 514 represents the filler engine 112 performing the Web Filler function, wherein the filler contents are presented for the user on the client computer 104.

Block 516 is a decision block that represents the web browser 108 and/or filler engine 112 determining whether the accessing of the data from the network 100 has completed. If not, control transfers to Block 514; otherwise, the filler engine 112 is disabled and control transfers to Block 506.

CONCLUSION

This concludes the description of the preferred embodiment of the invention. The following describes some alternative embodiments for accomplishing the present invention.

For example, those skilled in the art will recognize that any type of computer configuration and/or network configuration could benefit from the present invention.

Those skilled in the art will also recognize that many types of filler content could be used, in addition to those enumerated herein.

In addition, those skilled in the art will also recognize that many types of selection criteria for the filler content could be used in the present invention. For example, filler contents may be dynamically adjusted based on various criteria, such as a change in the latency or delay, a change in data volume, etc.

Those skilled in the art will recognize that customization of filler content need not take place only on the client computer. For example, in closed environments, where the server computer manages a known and pre-profiled group of users (e.g., corporate intranet, shopping clubs, etc.), user-customized filler contents may be generated from and/or stored on the server computer as well.

In summary, the present invention discloses a method, apparatus, and article of manufacture for alleviating problems of long latency or delay periods on the Internet through the presentation of filler content that keeps the user occupied. The cause and extent of the latency or delay may be identified either at a client or server computer and then communicated to the client computer to trigger the presentation of the filler content on the client computer. The filler content may comprise text data, graphics data, audio data, audiovisual data, or other data as desired, and provides just enough distraction to keep the user occupied, while retaining him/her for the completion of the session, transaction, or activity. The filler content may be provided by either a server computer or a client computer, and may be selected automatically by the server computer or the client computer or may be selected manually by the user so that it can be customized based on his/her taste for filler contents. The filler content could also be selected based on predetermined criteria, such as the context of the user's session, transaction, or activity, the data being accessed, etc.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of alleviating problems associated with delays in accessing data on a network, comprising:
   (a) accessing data on a network from a client computer;
   (b) identifying when a sufficient delay occurs during the accessing step, wherein the identifying step is performed by a server computer connected to the client computer via the network; and
   (c) presenting filler contents on the client computer during the identified sufficient delay.

2. The method of claim 1 above, wherein the sufficient delay is identified by the server computer and then communicated to the client computer to trigger the presenting of the filler contents on the client computer.

3. The method of claim 1 above, wherein the filler contents are provided by the server computer.

4. The method of claim 1 above, wherein the filler contents are selected by the server computer.

5. The method of claim 1 above, wherein the filler contents are directly related to the accessed data.

6. The method of claim 1 above, wherein the presenting of the filler contents do not interrupt the accessing of the data.

7. The method of claim 1 above, wherein the filler contents are presented while the accessing of the data continues.

8. The method of claim 1 above, wherein, if the presenting of the filler contents completes before the accessing of the data completes, new filler contents are presented.

9. The method of claim 1 above, wherein, if the accessing of the data completes before the presenting of the fillet contents completes, the presenting of the filler contents is terminated.

10. An apparatus for alleviating problems associated with delays in accessing data on a network, comprising:
    (a) a client computer connected to the network;
    (b) a browser, executed by the client computer, for accessing data on the network; and
    (c) a filler engine, executed by the client computer, for presenting filler contents on the client computer when a sufficient delay is identified in the accessing of the data on the network, wherein identification of the sufficient delay is performed by a server computer connected to the client computer via the network.

11. The apparatus of claim 10 above, wherein the sufficient delay is identified by the server computer and then communicated to the client computer to trigger the presenting of the filler contents on the client computer.

12. The apparatus of claim 10 above, wherein the filler contents are provided by the server computer.

13. The apparatus of claim 10 above, wherein the filler contents are selected by the server computer.

14. The apparatus of claim 10 above, wherein the filler contents are directly related to the accessed data.

15. The apparatus of claim 10 above, wherein the presenting of the filler contents do not interrupt the accessing of the data.

16. The apparatus of claim 10 above, wherein the filer contents are presented while the accessing of the data continues.

17. The apparatus of claim 10 above, wherein, if the presenting of the filler contents completes before the accessing of the data completes, new filler contents ate presented.

18. The apparatus of claim 10 above, wherein, if the accessing of the data completes before the presenting of the filler contents completes, the presenting of the filler contents is terminated.

19. A computer program carrier readable by a computer and embodying one or more instructions that are executable by the computer to perform method steps for alleviating problems associated with delays in accessing data on a network, the method comprising:
 (a) accessing data on a network from a client computer;
 (b) identifying when a sufficient delay occurs during the accessing step, wherein the identifying step is performed by a server computer connected to the client computer via the network; and
 (c) presenting filler contents on the client computer during the identified sufficient delay.

20. The computer program carrier of claim 19 above, wherein the sufficient delay is identified by the server computer and then communicated to the client computer to trigger the presenting of the filler contents on the client computer.

21. The computer program carrier of claim 19 above, wherein the filler contents are provided by the server computer.

22. The computer program carrier of claim 19 above, wherein the filler contents are selected by the server computer.

23. The computer program carrier of claim 19 above, wherein the filler contents are directly related to the user's transaction or session.

24. The computer program carrier of claim 19 above, wherein the presenting of the filler contents do not interrupt the accessing of the data.

25. The computer program carrier of claim 19 above, wherein the filler contents are presented while the accessing of the data continues.

26. The computer program carrier of claim 19 above, wherein, if the presenting of the filler contents completes before the accessing of the data completes, new filler contents are presented.

27. The computer program carrier of claim 19 above, wherein, if the accessing of the data completes before the presenting of the filler contents completes, the presenting of the filet contents is terminated.

\* \* \* \* \*